US007904062B2

(12) United States Patent
Ashkenazi et al.

(10) Patent No.: US 7,904,062 B2
(45) Date of Patent: Mar. 8, 2011

(54) SCROLLING MOBILE ADVERTISEMENTS

(75) Inventors: Zvi Ashkenazi, Cupertino, CA (US); Rodrigo Lopez, Mountain View, CA (US); Stewart Lin, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 486 days.

(21) Appl. No.: 11/683,912

(22) Filed: Mar. 8, 2007

(65) Prior Publication Data

US 2008/0220747 A1 Sep. 11, 2008

(51) Int. Cl.
- *H04M 3/42* (2006.01)
- *H04M 3/493* (2006.01)
- *H04M 1/00* (2006.01)
- *H04L 29/06* (2006.01)

(52) U.S. Cl. ............... 455/414.1; 455/414.2; 455/414.3; 455/566

(58) Field of Classification Search ............... 455/414.1, 455/414.2, 414.3, 566
See application file for complete search history.

(56) References Cited

U.S. PATENT DOCUMENTS

| | | | |
|---|---|---|---|
| 6,603,969 | B1 | 8/2003 | Vuoristo et al. |
| 2004/0209602 | A1 | 10/2004 | Joyce et al. |
| 2004/0254905 | A1 | 12/2004 | Tiku |
| 2004/0266388 | A1 | 12/2004 | Maes |
| 2004/0266408 | A1 | 12/2004 | Maes |
| 2005/0064852 | A1 | 3/2005 | Baldursson |
| 2005/0190280 | A1* | 9/2005 | Haas et al. ............... 348/333.05 |
| 2006/0094410 | A1* | 5/2006 | Cortegiano ............... 455/414.3 |

OTHER PUBLICATIONS

Butler, M. H., "CC/PP and UAProf: Issues, Improvements and Future Directions," Hewlett Packard Laboratories, pp. 1-7, Feb. 1, 2002.
JSR 118 Expert Group, "Mobile Information Device Profile for Java™ 2 Micro Edition, Version 2.0," Java Community Process, pp. 1-566, Nov. 5, 2002.
WAG UAProf, "Wireless Application Group User Agent Profile Specification," Wireless Application Protocol Forum, Ltd., pp. 1-76, Nov. 10, 1999.
WAP Forum, "Wireless Application Protocol, WAP 2.0, Technical White Paper," Wireless Application Protocol Forum Ltd., pp. 1-13, Jan. 2002.
WAP Forum, "Wireless Application Protocol White Paper," Wireless Internet Today, pp. 1-19, Jun. 2000.

* cited by examiner

*Primary Examiner* — Nick Corsaro
*Assistant Examiner* — Manpreet S Matharu
(74) *Attorney, Agent, or Firm* — Frommer Lawrence & Haug LLP; Jamie L. Wiegand

(57) ABSTRACT

A mobile device, system, and method are directed towards displaying an advertisement within a navigable view on a mobile device. In one embodiment, the navigable view employs a scrollable list. In one embodiment, a capability of the mobile device is employed to determine the mechanism for displaying of the advertisement within the navigable view. In one embodiment, the display mechanism may enable the advertisement to disappear from the mobile device's display after scrolling past the advertisement. In another embodiment, the advertisement is treated as a fixed entry within the scrollable view. As a fixed entry, scrolling past the advertisement results in the advertisement disappearing from the display of the mobile device. In still another embodiment, the advertisement is treated as a continually viewable entry within the navigable view, and in another embodiment, the advertisement may bounce to a top or a bottom of the navigable view as it is scrolled.

18 Claims, 8 Drawing Sheets

SCROLLING MOBILE ADVERTISEMENTS

TECHNICAL FIELD

The present invention relates generally to mobile communications and, more particularly, but not exclusively to managing continued navigation through scrollable content that includes an advertisement based, in part, on a capability of the mobile device.

BACKGROUND

Tremendous changes have been occurring in the Internet that influence our everyday lives. For example, mobile computing devices have become the vehicle to create new meeting grounds. They have been called the new power lunch tables and new golf courses for business life in the U.S. Moreover, many people are using such mobile computing device to reconnect themselves to their friends, their neighborhood, their community, and the world.

With this growth in the use of mobile computing devices has emerged a desire by many businesses to advertise to this group of users. However, while many of the mobile computing devices have become very sophisticated with respect to their display capabilities, forms of communication channels, and the like, other mobile computing devices provide more simplistic offerings. For example, many of today's mobile computing devices may limit screen display sizes, resolutions, color capability, and the like. Therefore, displaying of advertisements on different mobile computing devices remains a challenge. Moreover, there is a desire to provide a convenient mechanism for the user to manage their screen display while enabling viewing of the advertisement. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
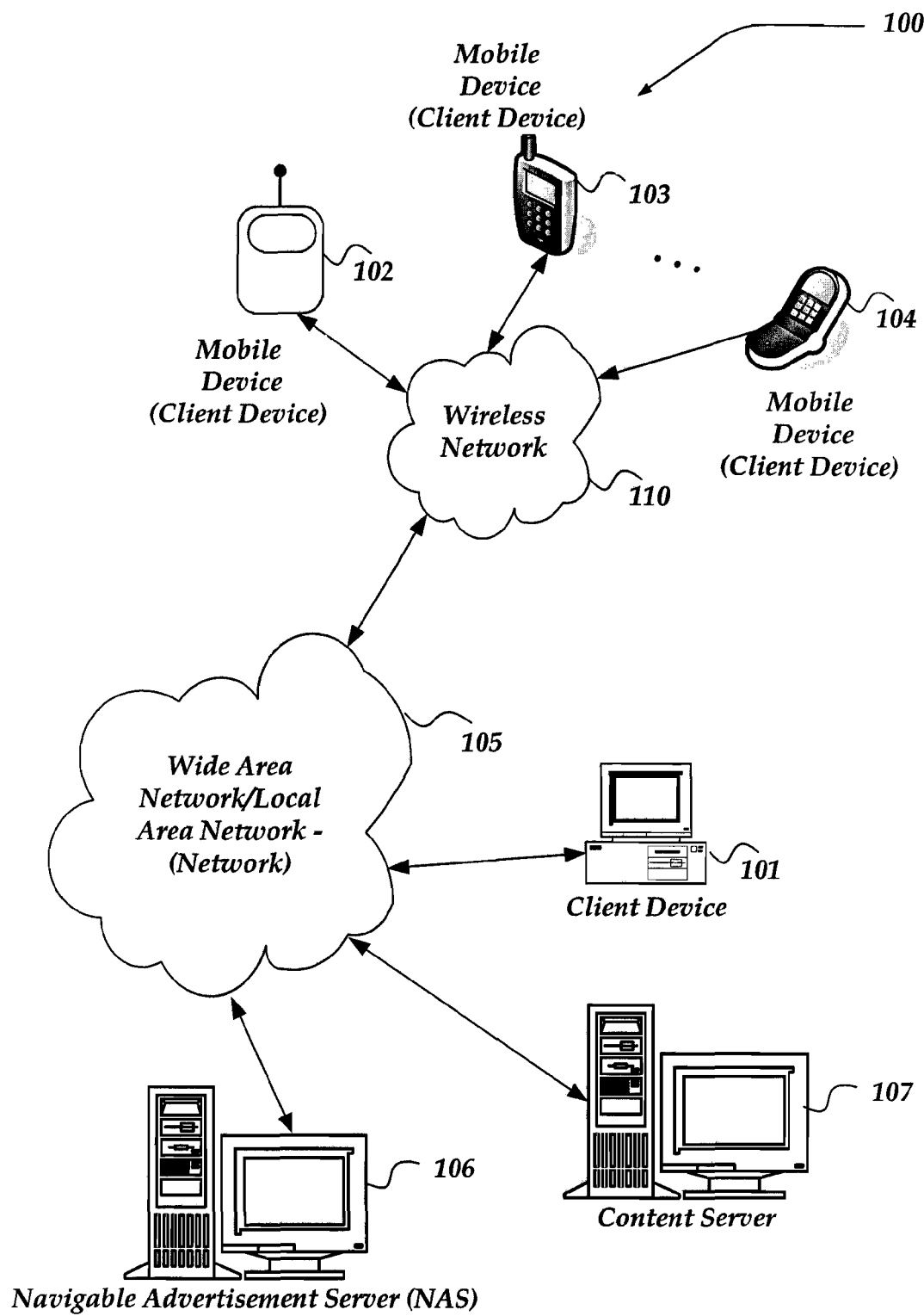
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

An advertisement, as used herein refers to any content that may be used to promote and/or educate the public. Often, the message is controlled by a sponsor of at least some of the content. Such content may be provided using any of a variety of mediums, including, but not limited to graphics, audio clips, video clips, text, or the like. In one embodiment, a URI, URL, or other link information may be provided to obtain access to the advertisement.

Briefly stated the present invention is directed towards selecting for use a mechanism for displaying of an advertisement within a navigable view on a mobile device. In one embodiment, the navigable view employs a scrollable list of items. In one embodiment, the advertisement may be configured as one of the scrollable items within the list of items. In one embodiment, a capability of the mobile device is employed to determine the mechanism for displaying of the advertisement within the navigable view. In one embodiment, the display mechanism may enable the advertisement to disappear from the mobile device's display after scrolling past the advertisement. In another embodiment, the advertisement is treated as a fixed entry within the scrollable list of items. As a fixed entry, scrolling past the advertisement may result in the advertisement disappearing from a portion of the display screen of the mobile device allocated to displaying of the navigable view of items. In still another embodiment, the advertisement may be configured as a continually viewable entry within the navigable view, and in another embodiment, the advertisement may bounce to a top or a bottom of the navigable view of items as they are scrolled.

Although many of the embodiments disclosed below are directed towards managing a display of an advertisement within a navigable view on a mobile device, the invention is not so constrained. Thus, the various embodiments may also manage the display of the advertisement within navigable views on other types of computing devices, without departing from the scope of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Navigable Advertisement Server (NAS) 106, mobile devices (client devices) 102-104, client device 101, and content server 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message.

Mobile devices 102-104 also may include at least one r client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to NAS 106, client device 101, or other computing devices. The information may also indicate a display capability of the mobile device, as well as other configuration aspects and/or capabilities of mobile devices 102-104.

Capabilities of mobile devices 102-104 may be obtained through a mobile device's user agent profile, such as that defined by the User Agent Profile Specification available from the Open Mobile Alliance (OMA). Another example of an information source for use in determining a mobile device's configuration and capability includes Composite Capability/Preference Profiles (CC/PP), defined by the World Wide Web Consortium. Further examples of profiles describing mobile device capabilities that may be employed include a mobile information device profile (MIDP), a wireless universal resource file (WURFL), and the like. User agent profiles or other similar standardized profiles generally include attributes of a mobile device, such as a screen size, a screen resolution, a memory size, and the like. Mobile device user agents may also provide information such as which applications and version of the application may reside on a mobile device. Such information may be provided in a message, or the like, sent to NAS 106, client device 101, or other computing devices. In one embodiment, the information may be provided upon request from the other computing device. However, the information may also be provided at a beginning of a communication with the other computing device, periodically during the communication, and/or based on some other event.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as NAS 106, client device 101, or the like. However, the present invention is not limited to these message protocols, and virtually any other message protocol may be employed.

Mobile devices 102-104 may further be configured to include a client application that enables the end-user to log into an end-user account that may be managed by another computing device, such as NAS 106. Such end-user account, for example, may be configured to enable the end-user to receive emails, send/receive IM messages, SMS messages, access selected web pages, or the like.

In addition, mobile devices 102-104 may include another application that is configured to enable the mobile user to display content, including advertisements, using a variety of mechanisms. For example, in one embodiment, mobile devices 102-104 may display content using a navigable viewing mechanism, such as a scrollable list. List navigable views may be employed by a variety of applications, including, but not limited to email applications, or the like. Such navigable views enable a user of mobile devices 102-104 to scroll within the list, select one or more items within the list, and to perform actions upon a selected item, or the like.

However, because mobile devices 102-104 may have differing display capabilities, a scrollable list of items displayed by one mobile device, may appear different than the same list of items displayed by another mobile device. Thus, in one embodiment, mobile devices 102-104 may include an application that is configured to select a display mechanism for navigable views that include advertisements based, in part, on a capability of the mobile device. However, the invention is not so constrained. For example, another computing device, such as NAS 106 may determine a display mechanism for displaying navigable views for the mobile device, based on the mobile device's capability.

Mobile devices 102-104 may also communicate with non-mobile client devices, such as client device 101, or the like. In one embodiment, such communications may include sending and/or receiving messages, share photographs, audio clips, video clips, or any of a variety of other forms of communications.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple NAS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between NAS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of NAS 106 is described in more detail below in conjunction with FIG. 3. Briefly, however, NAS 106 may include any computing device capable of connecting to network 105 to manage a display of a navigable view of items that includes an advertisement. In one embodiment, NAS 106 may communicate with another computing device, such as mobile devices 102-104, and/or client device 101, to determine its display capabilities. Then, based, in part, on the determined display capability, in one embodiment, NAS 106 may select a mechanism in which to display items with an advertisement within a navigable view. However, as mentioned above, in another embodiment, the client device may include an application that enables the client device to determine how to display such items. In one embodiment, the client application may receive an instruction from NAS 106, indicating how to display the navigable view of items.

Devices that may operate as NAS 106 include personal computers desktop computers, multiprocessor systems, microprocessor-based or programmable consumer electronics, network PCs, servers, and the like.

Content server 107 includes virtually any computing device that is configured to provide content to another computing device, including, but not limited to messaging content, such as emails, voice messages, IM messages, SMS messages, audio files, video files, graphics, documents, or the like. In one embodiment, content server 107 may be configured to operate as a website server. However, content server 107 may also operate as a messaging server, a File Transfer Protocol (FTP) server, a database server, or the like. Additionally, content server 107 may be configured to provide at least one advertisement to the other computing device. In one embodiment, the advertisement may be provided for display within a navigable view, such as a scrollable list, or the like.

Devices that may operate as content server 107 include personal computers desktop computers, multiprocessor systems, microprocessor-based or programmable consumer electronics, network PCs, servers, and the like.

Although FIG. 1 illustrates NAS 106 as a single computing device, the invention is not so limited. For example, one or more functions of NAS 106 may be distributed across one or more distinct computing devices. Moreover, in one embodiment, content server 107 and NAS 106 may be integrated into a single computing device, without departing from the scope or spirit of the present invention.

Illustrative Mobile Client Environment

Figure 2:
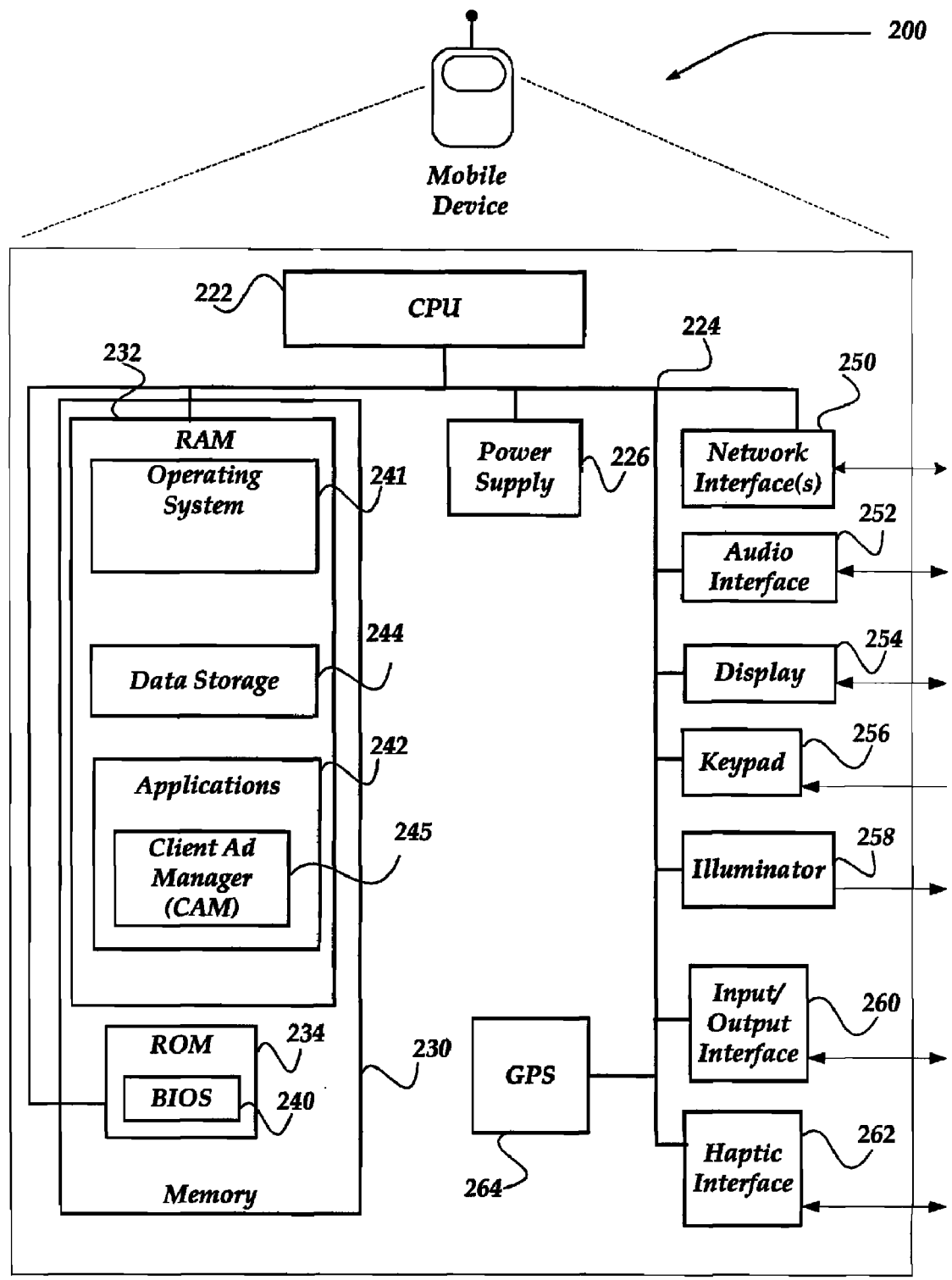
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (ITDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. At least a portion of the capability information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may further include Client Advertisement (Ad) Manager (CAM) 245.

CAM 245 may be configured to determine a capability of mobile device 200 for displaying navigable views of items that include advertisements. Then, in part, based on the determined capability, CAM 245 may select a navigable view mechanism for displaying the items. Thus, in one embodiment, CAM 245 may employ processes such as described below in conjunction with FIGS. 4-8 to perform at least some of its actions.

However, the invention is not so constrained. For example, in one embodiment, a user of mobile device 200 may also select a default navigable view mechanism. In another embodiment, CAM 245 may be configured to employ a default navigable view mechanism. In still another embodiment, CAM 245 may receive a selection for the navigable view mechanism from another computing device, such as NAS 106 of FIG. 1, or the like.

Illustrative Server Environment

Figure 3:
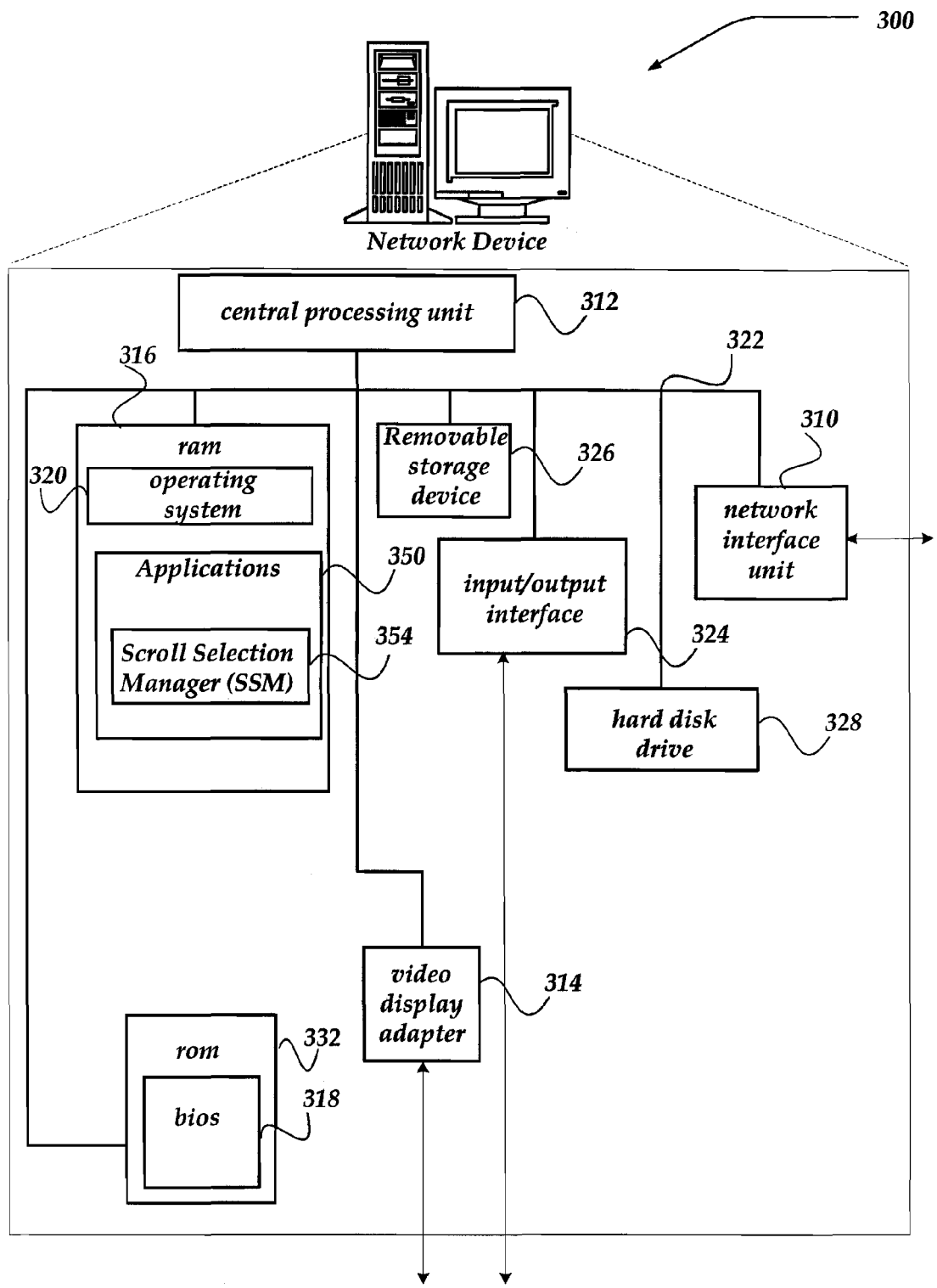
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, NAS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Scroll Selection Manager (SSM) 354 may also be included as an application program within applications 350.

SSM 354 is configured to determine a capability of another computing device for displaying navigable views that may include an advertisement. In one embodiment, SSM 354 may request information associated with the capability of the other computing device, during a communication with the other computing device.

SSM 354, may then, in one embodiment, based, in part, on the determined capability of the other computing device, select a navigable view mechanism for displaying items, including the advertisement at the other computing device. In one embodiment, SSM 354 may interact with a content server, messaging server, or the like, to manage the navigable view. For example, in one embodiment, SSM 354 may provide instructions, commands, applications, or the like, to the content server, messaging server, or the like, that may then be employed to manage the navigable view. In another embodiment, SSM 354 may receive the items, including the advertisement, from the content server, messaging server, or the like, and then manage the view directly. However, the invention is not so constrained. For example, in another embodiment, SSM 354 may send instructions, commands, applets, scripts, or the like, to the other computing device to enable it to display the items within the navigable view. In one embodiment, SSM 354 employ processes such as described below in conjunction with FIGS. 4-8 to perform at least some of its actions.

However, the invention is not constrained to employing a capability of the other computing device. For example, in one embodiment, a user of the other computing device may select a mechanism for displaying the items with a navigable view, or the like.

Generalized Operation

Figure 4:
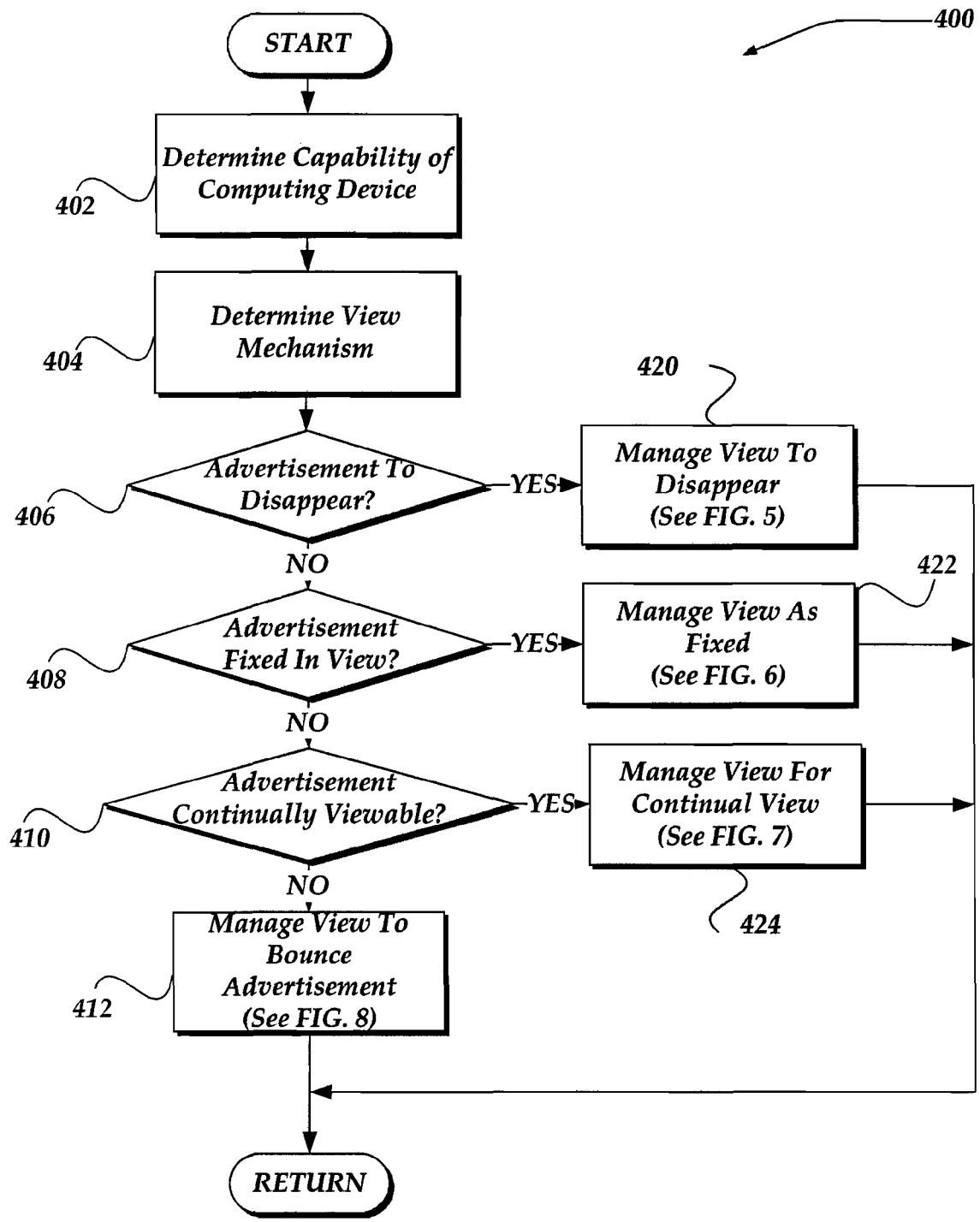
FIG. 4 illustrates a logical flow diagram generally showing one embodiment of a process for managing advertisements on a mobile device.

The operation of certain aspects of the invention will now be described with respect to FIGS. 4-8. FIG. 4 illustrates a logical flow diagram generally showing one embodiment of a process for managing advertisements on a mobile device.

Process 400 of FIG. 4 begins, after a start block, at block 402, where a capability of a computing device is determined. In one embodiment, the computing device is a client device, such as mobile devices 102-104 of FIG. 1. In another embodiment, the computing device is client device 101 of FIG. 1. In one embodiment, determination of the capability may be performed by requesting and/or receiving information from the computing device. Such information may include a capability associated with a display size, resolution, or the like.

In any event, processing continues to block 404, where based, in part, on the determined capability, in one embodiment, a mechanism for displaying items that include an advertisement within a navigable view is determined. In one embodiment, a default mechanism may be selected based a characteristic of the computing device. In another embodiment, a user of the computing device may provide a selection for the navigable view mechanism to be employed.

Processing continues next to decision block 406, where a determination is made whether the mechanism for displaying items enables the advertisement to disappear from the list of items. If so, processing then proceeds to block 420. Block 420 is described in more detail below in conjunction with FIG. 5. Briefly, however, at block 420, the display mechanism enables the user of the computing device to scroll the items, such that the advertisement operates as one of the scrollable items with the navigable view. At block 420, this enables the user to scroll the items, such that the advertisement may disappear from view within the display screen. Changing direction of the scrolling of the items does not result in the advertisement reappearing within the display screen however. Processing then returns to a calling process to perform other actions.

If however, at decision block 406, disappearing advertisements is not the determined mechanism, processing continues to decision block 408, where a determination is made whether the advertisement is configured as an item fixed within the list of items. If this mechanism is to be employed, processing flows to block 422. Block 422 is described in more detail below in conjunction with FIG. 6. Briefly, however, at block 422, the user may scroll items within the navigable view, including the advertisement. The advertisement is configured as a scrollable item within the view. Thus, the advertisement may be scrolled out of view, and then scrolled back into view, similar to any other item with a scrollable list. Processing then returns after block 422, to a calling process to perform other actions.

If, at decision block 408, the advertisement is not treated as an item fixed in the navigable view of items, processing proceeds to decision block 410. At decision block 410 a determination is made whether the navigable view mechanism to be employed enables the advertisement to be continually viewable. If so, processing continues to block 424; otherwise, processing flows to block 412.

Block 424 is described in more detail below in conjunction with FIG. 7. Briefly, however, at block 424, the advertisement is enabled to scroll within the navigable view, similar to other items within the view. However, as the advertisement reaches either a top edge or a bottom edge of the display screen, the advertisement remains pegged but visible at that edge, until the scrolling process is reversed. Then the advertisement scrolls, within the navigable view until it reaches another edge of the display screen allocated for the navigable view of items. Upon completion of block 424, processing returns to a calling process to perform other actions.

Block 412 is described in more detail below in conjunction with FIG. 8. Briefly, however, at block 412, the advertisement is treated as another item within the navigable view, such that it may scroll with the other items. However, if the advertisement reaches either a top or a bottom edge of the display screen, the advertisement bounces to an opposing edge of the display screen, and within the list of other items, such that the advertisement may again be scrolled. Thus, the advertisement remains always visible. In any event, upon completion of block 412, processing returns to a calling process to perform other actions.

Figure 5:
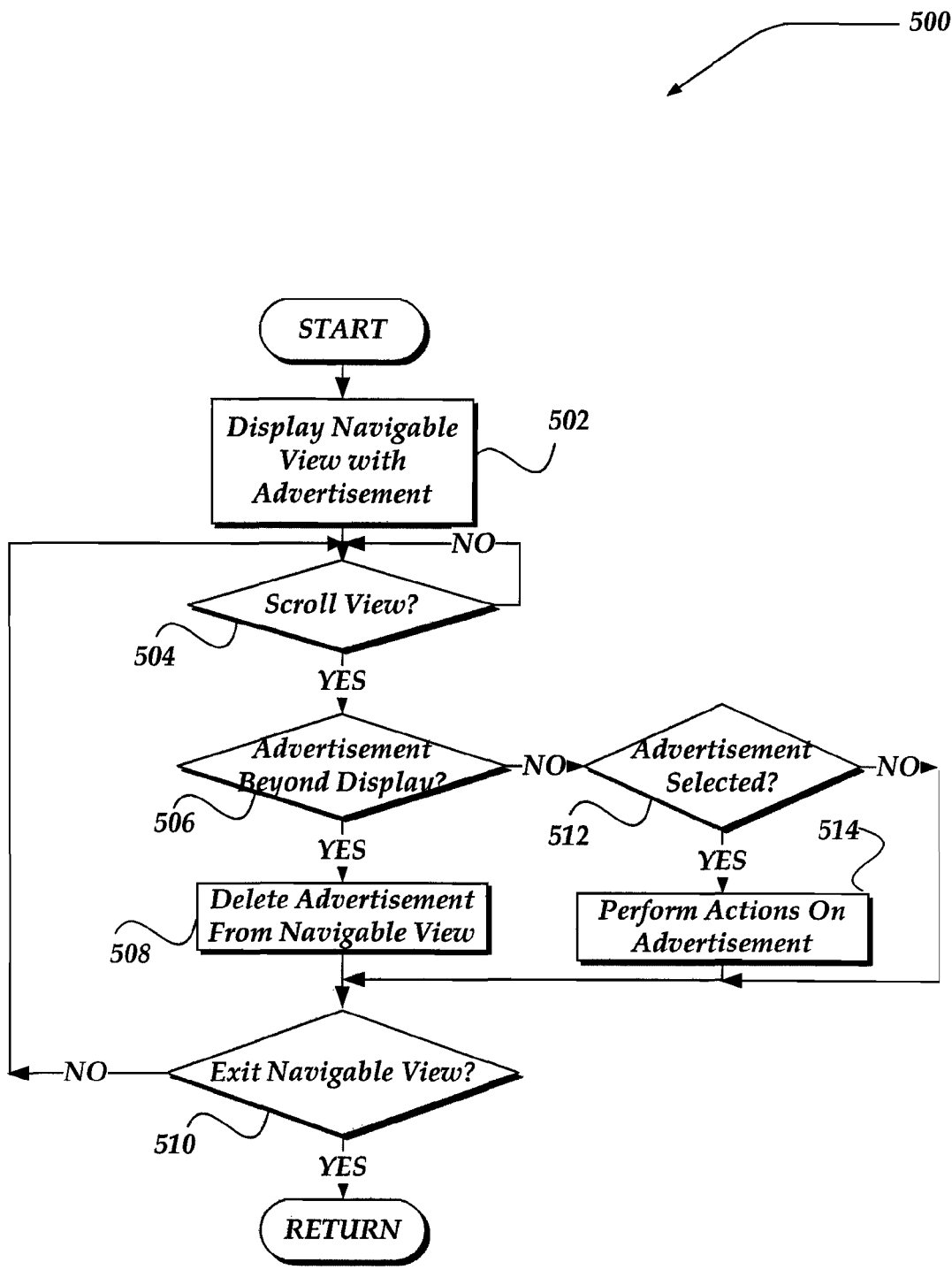
FIGS. 5-8 illustrate logical flow diagrams showing various embodiments of processes for managing the display of the advertisement on the mobile device, in accordance with the present invention.

FIG. 5 illustrates logical flow diagrams showing one embodiment of a process for managing the display of the advertisement on the mobile device, using disappearing advertisements.

It should be noted that process 500 of FIG. 5 is as simplified process. As such, although not illustrated, a user of the computing device displaying a navigable view of items that include an advertisement, may at virtually anytime, select to exit the view, select an item in the navigable view other than the advertisement, or the like. Such navigable views may be in the context of displaying a result of a search, contents of a messaging inbox, sent box, or the like. In one embodiment, a navigable view includes a scrollable list of items, where the advertisement is included as one of the scrollable items.

Process 500 begins, after a start block, at block 502, where the user has selected to display items that include an advertisement, in a navigable view. Processing flows next to decision block 504 where a determination is made whether the navigable view of items is scrolled. In one embodiment, the user may be provided a set of icons, keys, or the like, useable to scroll through the displayed items. If, the view is scrolled, processing flows to decision block 506; otherwise, processing loops back to decision block 504 until the view is scrolled.

At decision block 506, a determination is made whether scrolling resulted in the advertisement scrolling outside of the range of the display screen allocated for the display of the navigable view of items. If so, processing proceeds to block 508; otherwise, processing branches to decision block 512.

At block 508, the advertisement is removed from the list of items within the navigable view. Thus, scrolling the items in the navigable view, in an opposing direction would no longer show the advertisement. Processing then flows to decision block 510.

At decision block 512, a determination is made whether the scrolling results in highlighting or another form of selecting the advertisement. If not, processing branches to decision block 510; otherwise, processing flows to block 514. At block 514 the user may perform actions on the advertisement, including displaying the advertisement (and/or playing the advertisement where the advertisement may include audio, video, or the like), deleting the advertisement, or the like. Processing then branches to decision block 514.

At decision block 510, a determination is made whether to exit the navigable view of items. If so, processing returns to a calling process to perform other actions, otherwise, processing loops back to decision block 504, where the user may continue to scroll the items within the navigable view, absent displaying of the advertisement.

Figure 6:
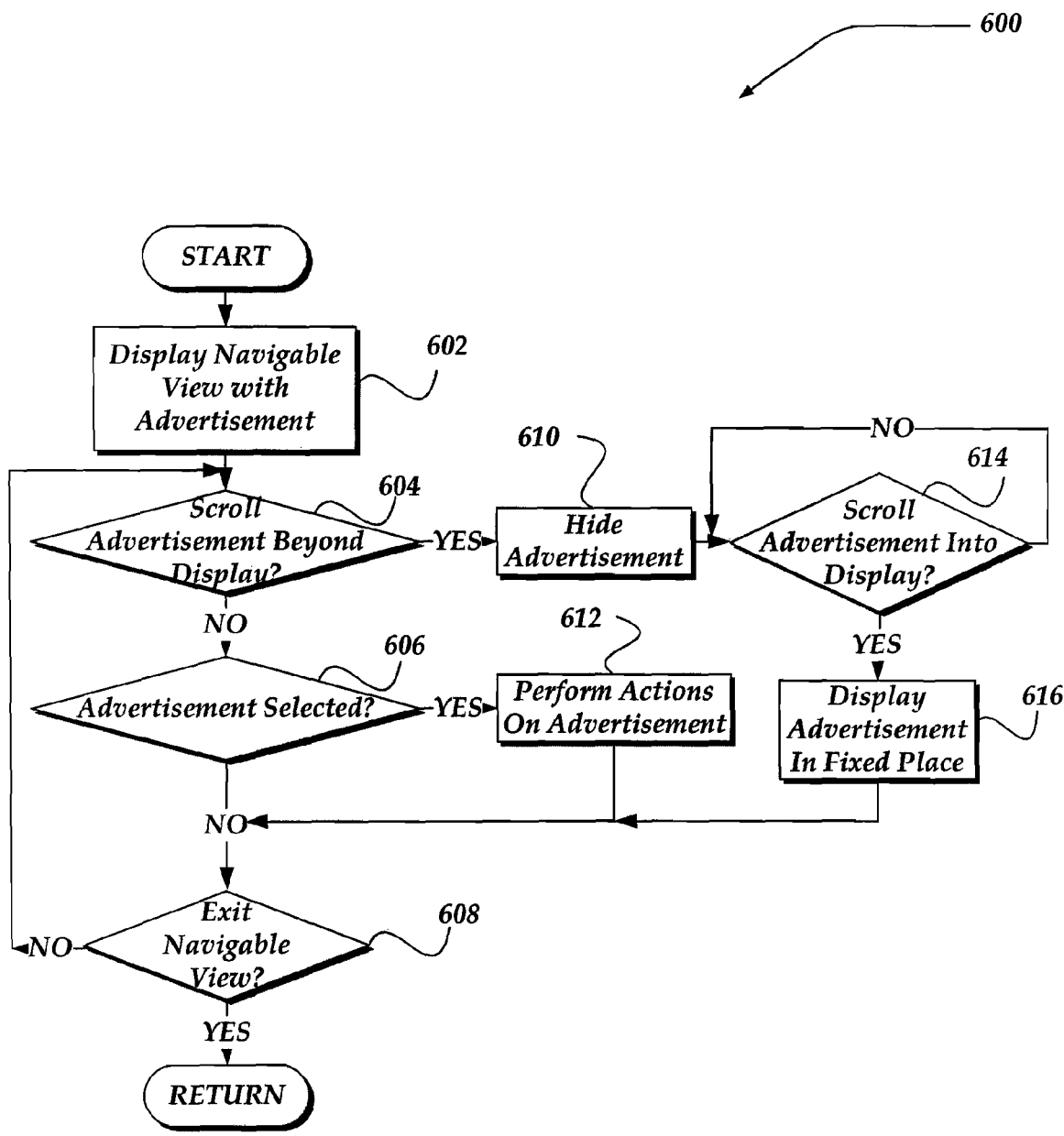

FIG. 6 illustrates logical flow diagrams showing one embodiment of a process for managing the display of the advertisement on the mobile device, using advertisements fixed within the navigable view.

FIG. 6 also illustrates a simplified process. As such, although not illustrated, a user of the computing device displaying a navigable view of items that include an advertisement, may at virtually anytime, select to exit the navigable view, select an item in the navigable view other than the advertisement, or the like. Such navigable views may be in the context of displaying a result of a search, contents of a messaging inbox, sent box, or the like. In one embodiment, a navigable view includes a scrollable list of items.

In any event, process 600 of FIG. 6, begins, after a start block, where the user's computing device displays a navigable view of items that include an advertisement. In one embodiment, the advertisement is displayed as one of the scrollable items within the navigable view. Thus, as the user scrolls through, the display of items, the advertisement may move upwards, or downwards, with the other items being scrolled.

Processing flows next to decision block 604, where a determination is made whether the scrolling of the navigable view of items results in the advertisement being scrolled beyond a portion of the display screen allocated for display of the navigable view of items. If not, processing continues to decision block 606. However, if the advertisement is scrolled beyond the display screen, processing branches to block 610, where similar to any other item, scrolled beyond the display screen, the advertisement becomes hidden from view. Processing next flows to decision block 614.

At decision block 606, a determination is made whether the scrolling of the navigable view of items results in the advertisement being selected, or otherwise highlighted. If so, processing flows to block 612; otherwise, processing continues to decision block 608.

At block 612, the user may perform actions on the advertisement, including displaying or otherwise playing the advertisement, executing a link such as a URL or the like, to the advertisement, or the like. Processing then flows to decision block 608.

At decision block 614, a determination is made whether the hidden advertisement is scrolled back into the view within the display screen. That is, the advertisement operates as an item fixed within the list of items, such that scrolling of the navigable view of items, may move the advertisement into or out of view on the display screen. If the scrolling maintains, the advertisement outside of the range of the display screen, processing loops back around to decision block 614. Otherwise, if the scrolling moves the advertisement back into the range of the display screen, processing flows to block 616, where the advertisement is made visible again. Processing then flows to decision block 608.

At decision block 608, a determination is made whether the navigable view of items is to be exited. If so, processing returns to a calling process to perform other actions; otherwise, processing may loop back to decision block 604, to continue actions on the navigable view of items.

Figure 7:
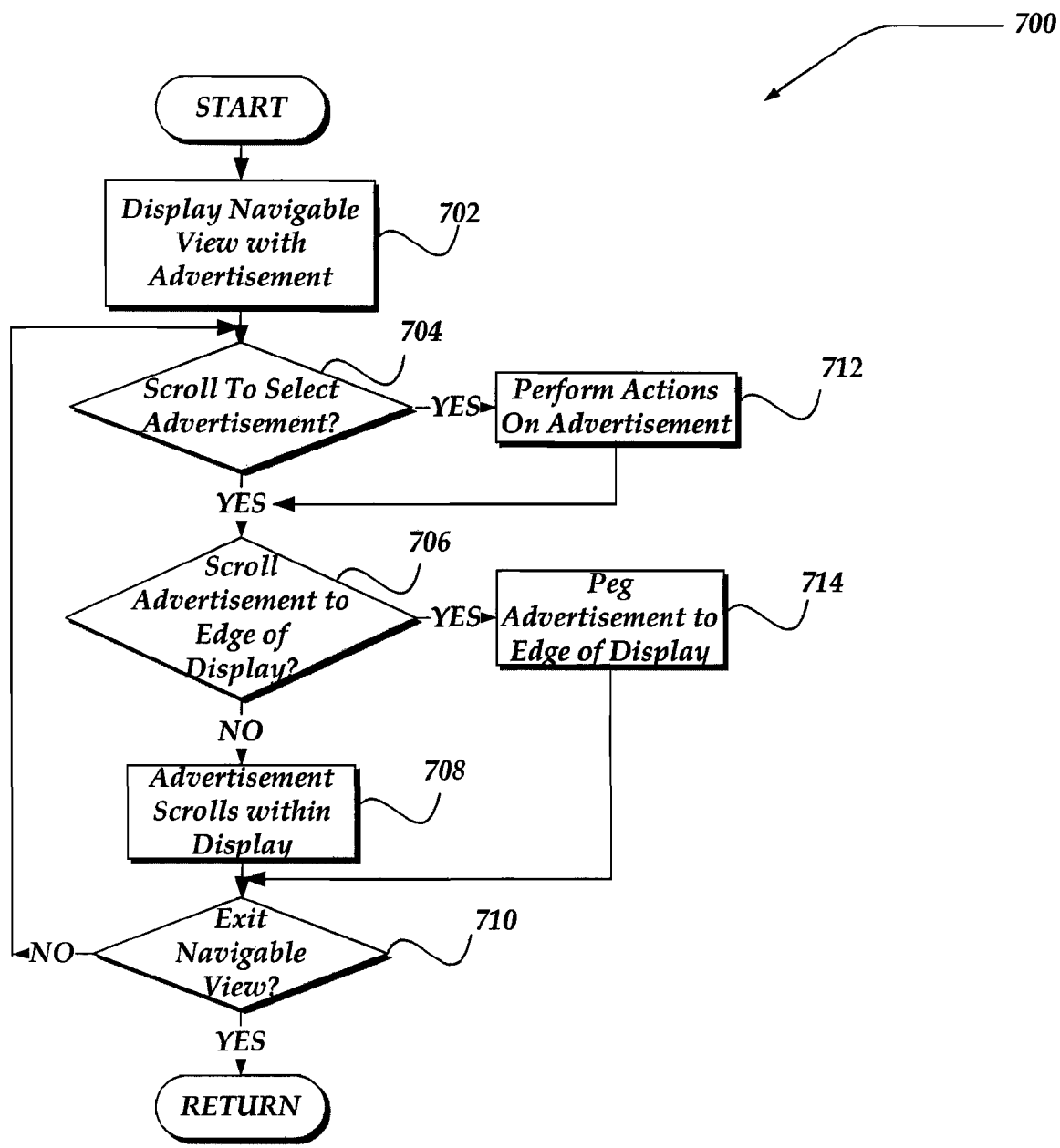

FIG. 7 illustrates logical flow diagrams showing one embodiment of a process for managing the display of the advertisement on the mobile device, using advertisements pegged at a display edge.

FIG. 7 illustrates a simplified process. As such, although not illustrated, a user of the computing device displaying a navigable view of items that include an advertisement, may at virtually anytime, select to exit the navigable view, select an item in the navigable view other than the advertisement, or the like. Such navigable views may be in the context of displaying a result of a search, contents of a messaging inbox, sent box, or the like. In one embodiment, a navigable view includes a scrollable list of items.

As shown, process 700 of FIG. 7, begins, after a start block, at block 702, where a navigable view of items that include an advertisement is displayed on a computing device's screen. As before, the advertisement may be configured as one of the items with a scrollable list of items within the navigable view, except as described below, the advertisement may remains always within view in the display screen.

Process 700 proceeds to decision block 704 where a determination is made, whether scrolling of the list of items results in the advertisement being selected or otherwise highlighted. If not, processing proceeds to decision block 706; otherwise, processing branches to block 712. At block 712, the user may perform actions on the selected advertisement, including, but not limited to executing the advertisement, deleting the advertisement, or the like. Process 700 then flows to decision block 706.

At decision block 706, a determination is made whether the scrolling of the list of items within the navigable view results in the advertisement moving to an edge of the display screen. That is, the advertisement is scrolled to a top of the display screen, or a bottom of the display screen allocated for display of the items, but remains visible within the screen display. If so, then processing flows to block 714; otherwise, processing to block 708.

At block 708, the advertisement may scroll up or down along with the rest of items within the list of items. That is, if the advertisement is pegged at one of the edges, and scrolling is in an opposing direction from where the advertisement is pegged, the advertisement may move from the edge of the screen, towards the opposing edge of the screen, along with other items in the list of items.

At block 714, the advertisement remains pegged within the display screen at one of the edges. That is, the advertisement remains within view, and does not disappear. Processing then flows to decision block 710, where a determination is made to exit the navigable view of items. If so, processing returns to a calling process to perform other actions; otherwise, processing loops back to decision block 704.

Thus, as illustrated in process 700, the advertisement may scroll along with other items within the list of items, but does not disappear from the screen view, as other items within the list would. Instead, when the advertisement reaches one of the edges of the display screen, the advertisement remains at that edge, until scrolling is performed in another direction, such that the advertisement again scrolls.

Figure 8:
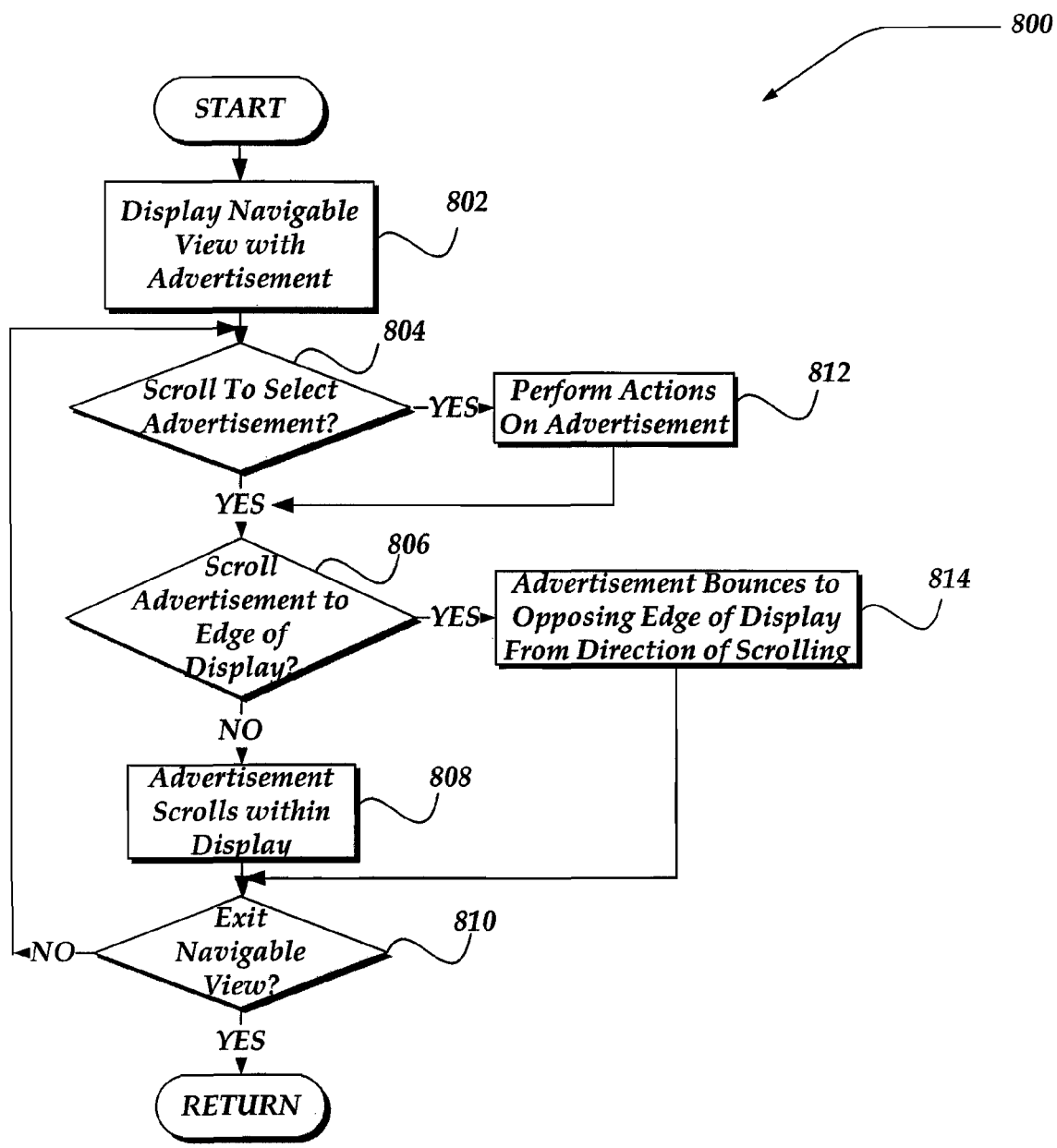

FIG. 8 illustrates logical flow diagrams showing one embodiment of a process for managing the display of the advertisement on the mobile device, using bouncing advertisements during scrolling.

As with the other processes described above, FIG. 8 illustrates a simplified process. As such, although not illustrated, a user of the computing device displaying a navigable view of items that include an advertisement, may at virtually anytime, select to exit the navigable view, select an item in the navigable view other than the advertisement, or the like. Such navigable views may be in the context of displaying a result of a search, contents of a messaging inbox, sent box, or the like. In one embodiment, a navigable view includes a scrollable list of items.

Process 800 of FIG. 8 begins, after a start block, at block 802, where the navigable view of items that include an advertisement is displayed at a computing device. As before, the advertisement is illustrated and configured as an item within a scrollable list of items. Thus, the advertisement may scroll within the navigable view, along with other items, except that the advertisement may also bounce up or down in the list of items, as described below.

Processing continues to decision block 804, where the user may scroll the list of items within the navigable view of items. As such, a determination is made at decision block 804 where the scrolling results in selection of the advertisement. If not, processing continues to decision block 806; otherwise, processing moves to block 812. At block 812, the user may perform actions on the advertisement, including, but not limited to executing the advertisement, executing a link to advertisement, viewing or otherwise playing the advertisement, deleting the advertisement, or the like. Processing then flows to decision block 806.

At decision block 806, a determination is made whether scrolling of the items within the navigable view results in the advertisement moving to an edge of the screen display, such as a top edge or bottom edge of the screen display allocated for display of the items. If the advertisement is scrolled to an edge of the screen display allocated for display of the items, processing flows to block 814; otherwise, processing continues to block 808.

At block 808, the advertisement may scroll along with other items within the navigable view of items. Processing flows next to decision block 810.

At block 814, the advertisement bounces to the opposing edge of the screen display within the list of displayed items. Thus, in one embodiment, where the advertisement is scrolled down in the display screen to a bottom edge, the advertisement bounces up to the top edge of the display screen, within the list of items. In this manner, the advertisement remains always visible within the list of displayed items. Similarly, if the advertisement is scrolled up to a top edge, the advertisement bounces down to the bottom edge of the display screen within the list of items. Again, the advertisement remains visible within the displayed list of items within the navigable view of items. Processing then flows to decision block 810.

At decision block 810, a determination is made whether to exit the navigable view of items that include an advertisement. If so, processing returns to a calling process to perform other actions; otherwise, processing may loop back to decision block 804.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A mobile device that is operative to manage a view of an advertisement on a mobile device, comprising:
    a memory component for storing data; and
    a processing component configured to execute data that enables actions, including: determining a display capability of the mobile device;
    selecting, based on the determined display capability, a view mechanism from a plurality of view mechanisms for displaying a scrollable list of a plurality of non-advertisement items that further includes the advertisement within the scrollable list, wherein a selectable first viewing mechanism allows a user to scroll the list of the plurality of non-advertisement items including the advertisement in a first direction until the advertisement disappears from within the display based on scrolling, and if the advertisement disappears from within the display due to the scrolling, deleting the advertisement from the scrollable list of the plurality of non-advertisement items such that scrolling the list of the plurality of non-advertisement items in a reverse direction shows the list of the plurality of non-advertisement items without the deleted advertisement;
    and employing the selected view mechanism to enable the advertisement to scroll within the display.

2. The mobile device of claim 1, wherein the plurality of view mechanisms another view mechanism that further comprises:
    enabling a user to scroll the list of items including the advertisement in a first direction, until the advertisement disappears from within the display of items; and
    enabling the user to scroll the list of items including the advertisement in a second direction until the advertisement reappears within the display of items, the advertisement remaining within a fixed relative position within the list of items.

3. The mobile device of claim 1, wherein the plurality of view mechanisms another view mechanism that further comprises:
    enabling a user to scroll the list of items including the advertisement in a first direction until the advertisement is displayed at an edge of the display allocated for displaying the list of items;
    if the list of items is scrolled further in the first direction, the advertisement remains at the edge of the display, while another item within the list of items disappears from the display; and
    if the list of items is scrolled in a reverse direction the advertisement scrolls in the same reverse direction within the list of items.

4. The mobile device of claim 1, wherein the plurality of view mechanisms another view mechanism that further comprises:
    enabling a user to scroll the list of items including the advertisement in a first direction until the advertisement is displayed at a first edge of the display allocated for displaying the list of items;
    if the user continues to scroll the list of items in the first direction, the advertisement automatically relocates to an opposing edge of the display within the list of items.

5. The mobile device of claim 1, wherein the view mechanism is user-selectable.

6. A non-transitory processor readable medium that includes data, wherein the execution of the data provides for managing a display of an advertisement on a mobile device by enabling actions, including:
    determining a display capability of the mobile device;
    selecting, based on the determined display capability, a view mechanism for displaying a scrollable list of a plurality of non-advertisement items that includes the advertisement within the scrollable list of the plurality of non-advertisement items, wherein the view mechanism is selected from one of the following:
    a processor to configure such that the advertisement is deleted from the scrollable list of the plurality of non-advertisement items, if the advertisement is scrolled beyond an edge of the display allocated to display the scrollable list of items, such that when the list of the plurality of non-advertisement items is scrolled in an opposite direction the list of the plurality of non-advertisement items is displayed without the deleted advertisement,
    a processor to configure such that the advertisement is configured as a scrollable item fixed in a relative position within the scrollable list of the plurality of non-advertisement items,
    a processor to configure such that the advertisement is configured as a scrollable item within the list of the plurality of non-advertisement items, and if the advertisement is scrolled to the edge of the display, the advertisement remains visible at that edge, while another item within the scrolled list of the plurality, of non-advertisement items scrolls beyond the edge of the display such that the other item disappears from the display, or
    a processor to configure such that the advertisement is configured as a scrollable item within the list of the plurality of non-advertisement items, and if the advertisement is scrolled to the edge of the display, the advertisement is automatically relocated to be displayed at an opposing edge of the display within the scrollable list of the plurality of non-advertisement items; and
    employing the view mechanism to enable the advertisement to scroll within the display.

7. The processor readable medium of claim 6, wherein selection of the view mechanism is performed at a remote server.

8. The processor readable medium of claim 6, wherein selection of the view mechanism is performed at the mobile device.

9. The processor readable medium of claim 6, wherein the scrollable list of items further comprises at least one of a search results, or a list of messages from one of a messaging inbox or sent box.

10. The processor readable medium of claim 6, wherein the advertisement further comprises link information to a portion of the advertisement.

11. A network device to manage a display of an advertisement at a mobile device, comprising:
 a transceiver to send and receive data over the network; and
 a processor that is configured to operate to perform actions, including:
  determining a display capability of the mobile device;
  selecting, based on the determined display capability, a view mechanism for displaying a scrollable list of a plurality of non-advertisement items that includes the advertisement within the scrollable list of the plurality of non-advertisement wherein at least one selectable view mechanism is arranged to:
  enable a user to scroll the list of the plurality of non-advertisement items including the advertisement, in a first direction until the advertisement disappears from within the display due to the scrolling, and if the advertisement disappears from within the display, deleting the advertisement from the scrollable list of the plurality of non-advertisement items, such that scrolling the list of the plurality of non-advertisement in a reverse direction shows the list of the plurality of non-advertisement items without the advertisement; and
  enabling a user of the mobile device to employ the selected view mechanism to manage the display of the advertisement.

12. The network device of claim 11, wherein the view mechanism is arranged to perform actions, further including:
 enabling a user to scroll the list of items including the advertisement in a first direction, until the advertisement disappears from within the display of items; and
 enabling the user to scroll the list of items including the advertisement in a second direction until the advertisement reappears within the display of items, the advertisement remaining within a fixed relative position within the list of items.

13. The network device of claim 11, wherein the view mechanism is arranged to perform actions, further including:
 enabling a user to scroll the list of items including the advertisement in a first direction until the advertisement is displayed at an edge of the display allocated for displaying the list of items;
 if the list of items is scrolled further in the first direction, the advertisement remains at the edge of the display, while another item within the list of items disappears from the display; and
 if the list of items is scrolled in a reverse direction the advertisement scrolls in the same reverse direction within the list of items.

14. The network device of claim 11, wherein the view mechanism is arranged to perform actions, further including:
 enabling a user to scroll the list of items including the advertisement in a first direction until the advertisement is displayed at a first edge of the display allocated for displaying the list of items;
 if the user continues to scroll the list of items in the first direction, the advertisement automatically relocates to an opposing edge of the display within the list of items.

15. A method of managing a display of an advertisement on a client device over a network, comprising:
 determining a display capability of the client device;
 selecting, based on the determined display capability, a view mechanism for displaying a scrollable list of a plurality of non-advertisement items that includes the advertisement within the scrollable list of the plurality of non-advertisement, wherein the view mechanism is selected from one of the following:
 a processor to configure such that the advertisement is deleted from the scrollable list of the plurality of non-advertisement items, if the advertisement is scrolled beyond an edge of the display allocated to display the scrollable list of the plurality of non-advertisement items, such that when the list of the plurality of non-advertisement items is scrolled in an opposite direction the list of the plurality of non-advertisement items is displayed without the deleted advertisement,
 a processor to configure such that the advertisement is a scrollable item fixed in a relative position within the scrollable list of the plurality of non-advertisement items,
 a processor to configure such that the advertisement is a scrollable item within the list of the plurality of non-advertisement items, but if the advertisement is scrolled to the edge of the display, the advertisement remains visible at that edge, while another item within the scrolled list of the plurality of non-advertisement items is enabled to scroll beyond the edge of the display such that the other item disappears from the display, or
 a processor to configure such that the advertisement is a scrollable item within the list of the plurality of non-advertisement items, but if the advertisement is scrolled to the edge of the display, the advertisement is automatically relocated to be displayed at an opposing edge of the display of the scrollable list of the plurality of non-advertisement items; and
 enabling a user of the client device to employ the selected view mechanism to display the advertisement.

16. The method of claim 15, wherein selection of the view mechanism is further configured to be user-selectable.

17. The method of claim 15, wherein the selection of the view mechanism is preformed at the client device or at a remote server.

18. A non-transitory computer-readable storage medium configured to include program instructions for performing the method of claim 15.

* * * * *